Dec. 9, 1930.  F. P. FAIRCHILD  1,784,586
FURNACE
Filed Feb. 5, 1926  4 Sheets-Sheet 1

INVENTOR
Frederich P. Fairchild,
BY
Gifford, Scull  ATTORNEYS

Dec. 9, 1930.  F. P. FAIRCHILD  1,784,586
FURNACE
Filed Feb. 5, 1926  4 Sheets-Sheet 3

Frederick P. Fairchild, INVENTOR
BY
Gifford & Scull, ATTORNEYS

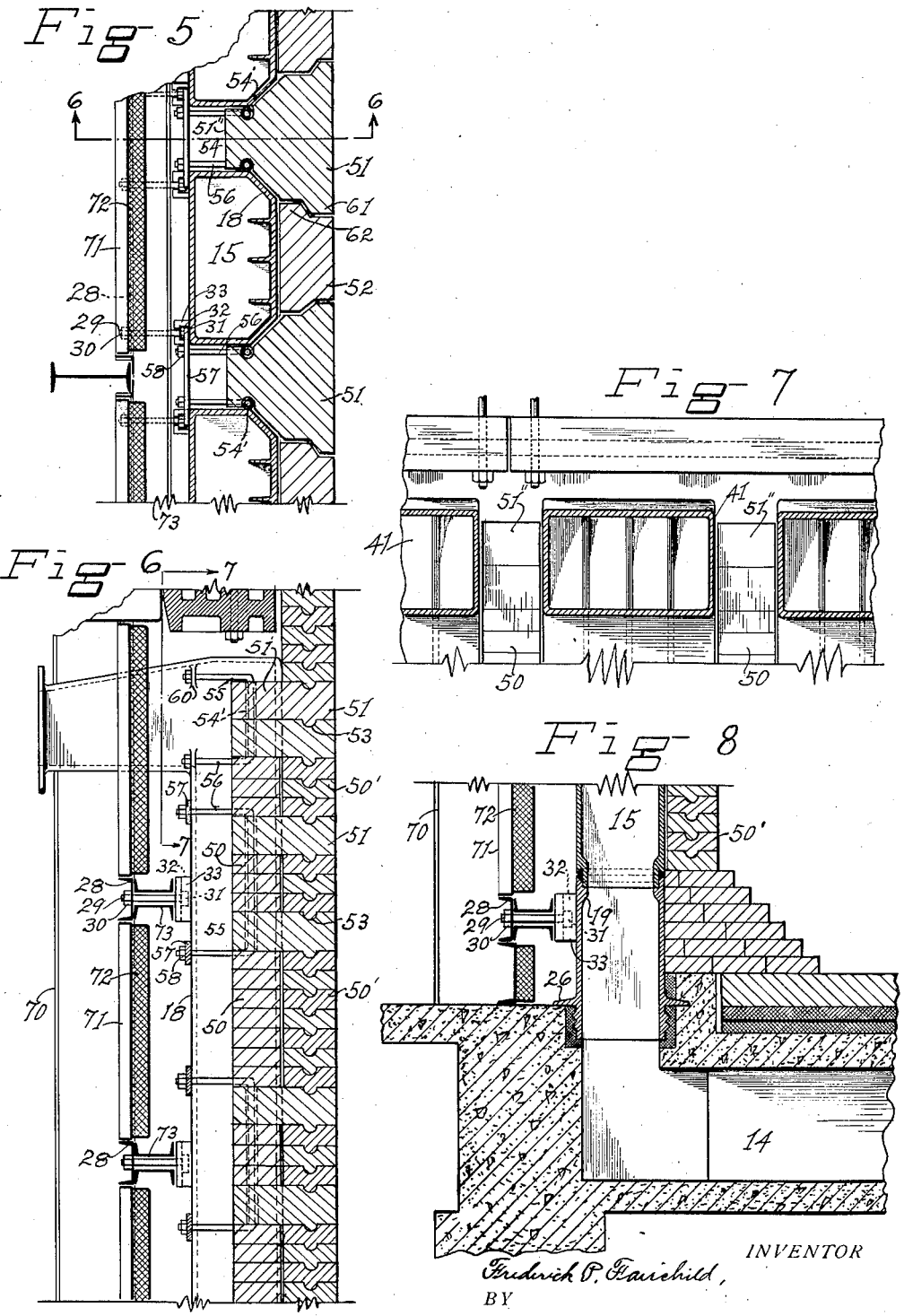

Patented Dec. 9, 1930

1,784,586

UNITED STATES PATENT OFFICE

FREDERICK P. FAIRCHILD, OF WHITE PLAINS, NEW YORK, ASSIGNOR TO THE BABCOCK & WILCOX COMPANY, OF BAYONNE, NEW JERSEY, A CORPORATION OF NEW JERSEY

FURNACE

Application filed February 5, 1926. Serial No. 86,273.

Figure 1:
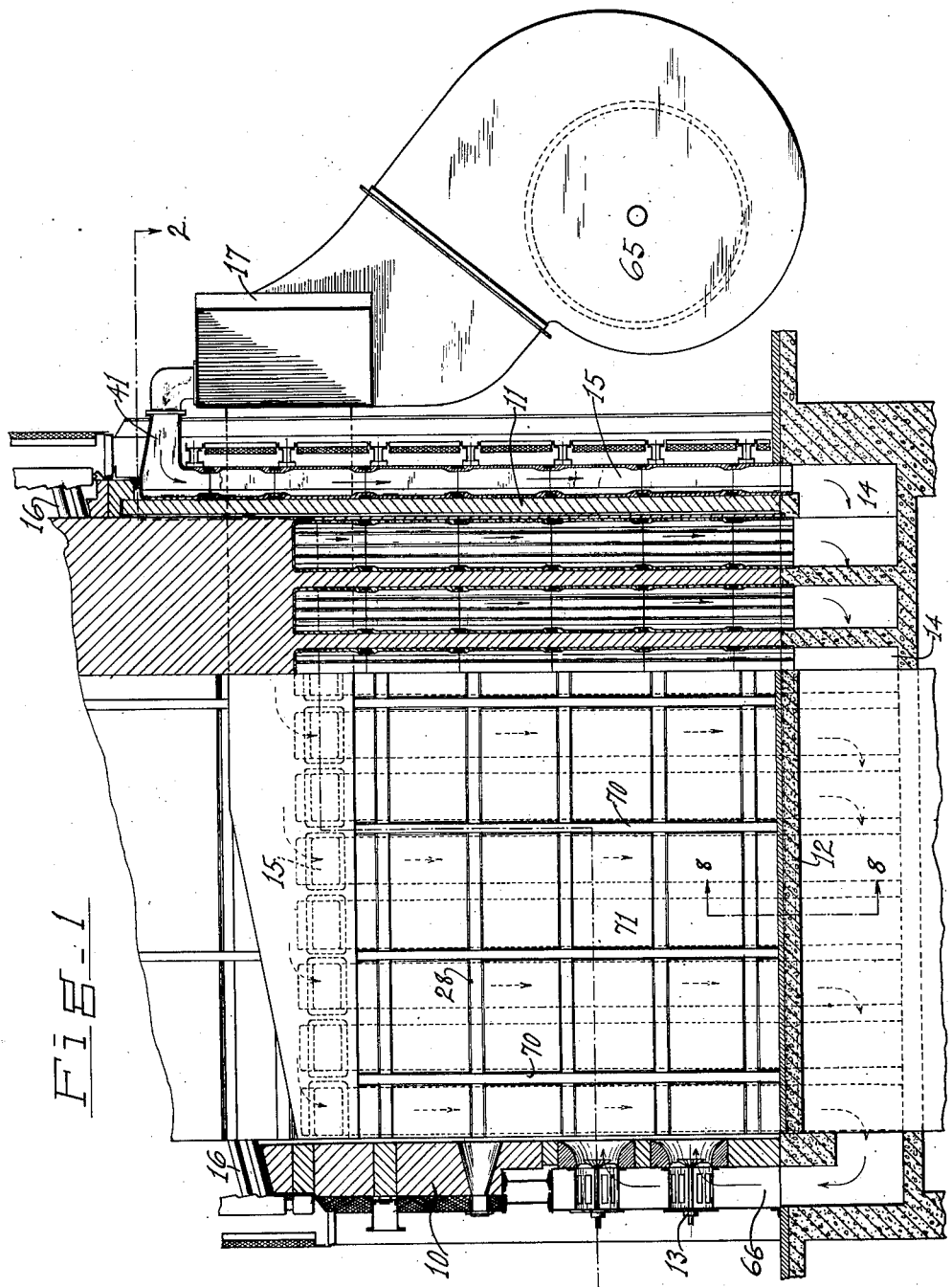
Figure 2:
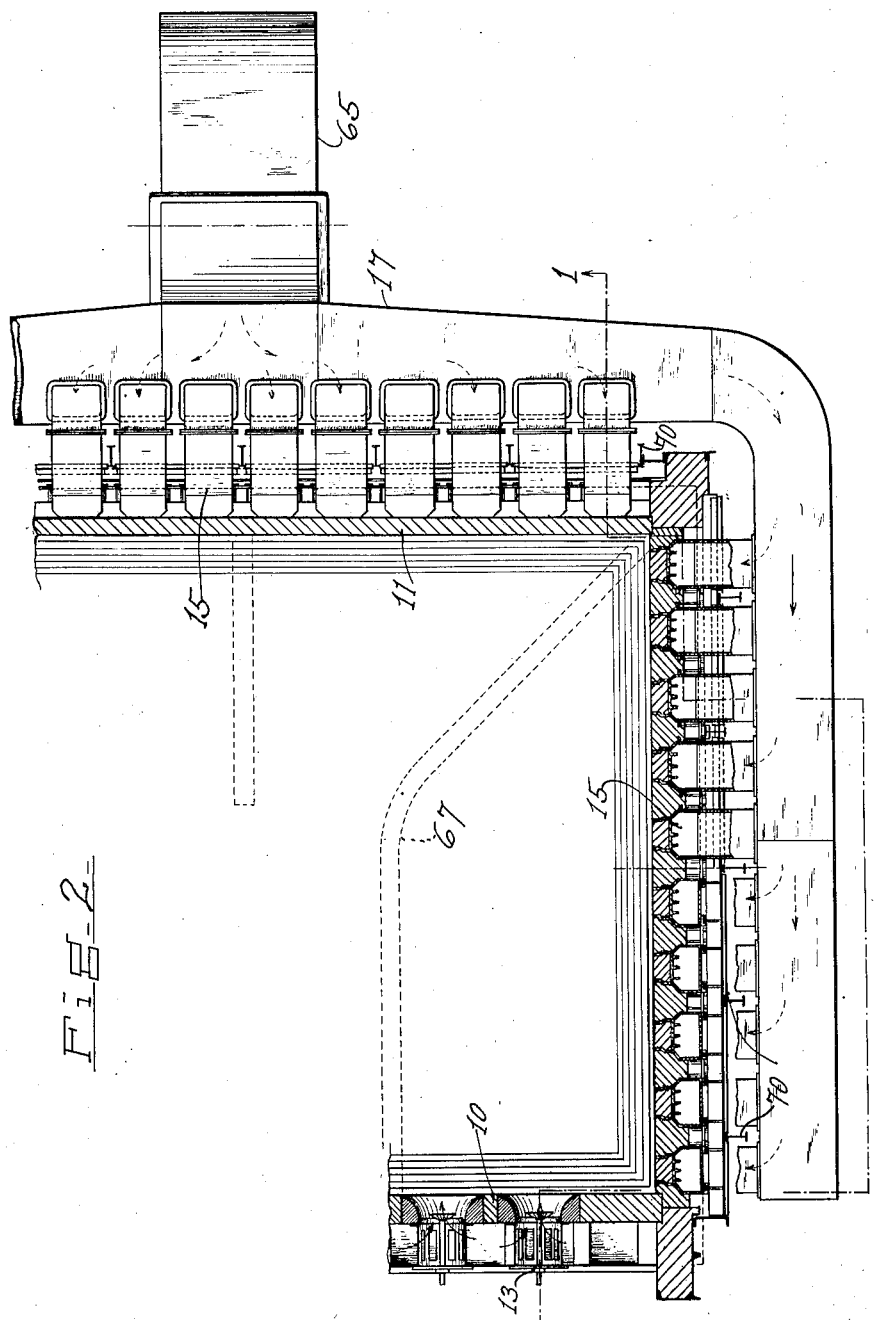
Figure 3:
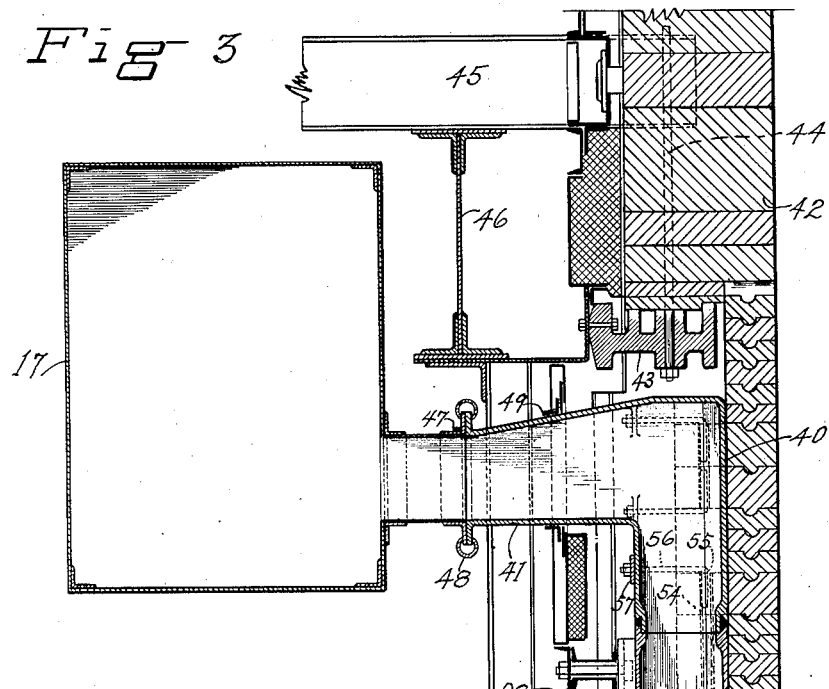
Figure 4:
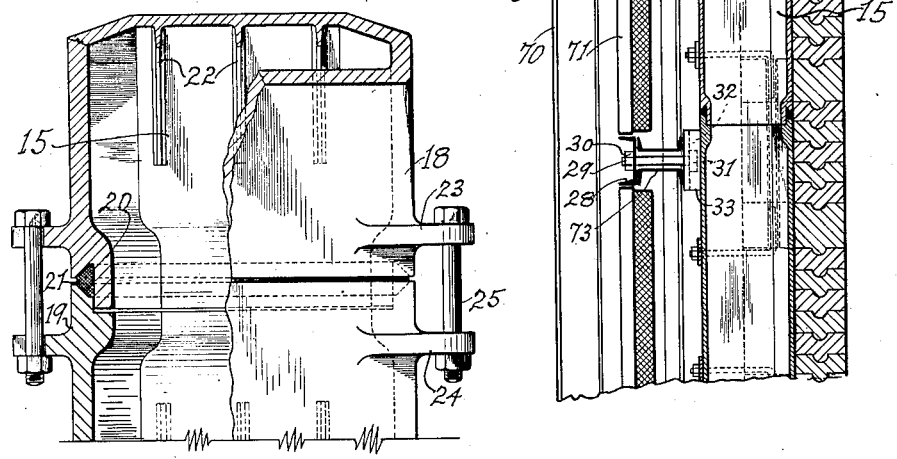

My present invention relates to furnaces, particularly furnaces subjected to high heat, and will be best understood from the following description and the annexed drawings, in which Fig. 1 is a side elevation of a furnace embodying one form of my invention, parts being shown in section in Fig. 1, along the line 1—1 of Fig. 2; Fig. 2 is a section along the line 2—2 of Fig. 1; Fig. 3 is a vertical section of a portion of the furnace wall on an enlarged scale and showing the details; Fig. 4 is a side view, partly in section, showing the ducts; Fig. 5 is a section along the line 5—5 of Fig. 3; Fig. 6 is a section along the line 6—6 of Fig. 5; Fig. 7 is a section along the line 7—7 of Fig. 6; and Fig. 8 is a section along the line 8—8 of Fig. 1.

In the illustrative form of my invention shown in the drawings, a furnace chamber having vertical walls 10, 11, and a bottom 12 is provided with one or more oil or powdered fuel burners 13 across the front of the furnace in the usual manner, although other types of furnaces, such as one with a chain grate stoker, for example, may be used. The furnace bottom 12 has an air space 14 beneath it, this air space communicating with vertical ducts 15 in the furnace walls and leading to the combustion space of the furnace through the registers of the oil burners 13. Above the furnace may be placed a steam boiler, a portion of such a boiler being indicated at 16.

In order to cool the walls and also to maintain them in position, I provide in the walls, and particularly in the side and rear walls in the form shown. a series of vertically disposed air ducts 15, preferably formed of metal and spaced apart so as to form a row of spaced ducts. In the form shown, these ducts communicate with the air space 14 beneath the furnace bottom and also with a manifold or main air duct 17 at the top through which air may be passed to circulate air through the furnace ducts that are installed in the furnace walls. These air ducts are made substantially air tight so that air can be forced therethrough with considerable pressure without danger of the same leaking an undue amount into the furnace.

The specific arrangement of my preferred form of air ducts is best shown in Figs. 4, 5 and 6. The air ducts preferably are formed as tubes made up as a plurality of sections set end on end and preferably such tubes are of cast metal. In the arrangement shown, the ducts 15 are made up of sections 18, each of which has a recessed shoulder 19 at its upper end, the lower end of the next upper section 18 has a reduced flange 20 fitting in this recess, which may be provided with suitable packing 21, as shown best in Fig. 4. The ducts are provided with spaced vertical fins 22, and each duct has its lowermost section provided with a flange 26, resting on the foundations of the furnace with an opening connecting to the air space 14, as shown best in Fig. 8. The upper end of a section 18 of the duct is beveled, and the lower end of the next section is provided with a beveled groove to provide a space for the packing 21. The annular flange 20 of smaller diameter on the lower end of the section serves to retain the packing in position. The flange 20 fits within a cut-away portion 19 in the upper end of a lower section. The sections of the duct are provided with lugs 23 and 24, through which bolts 25 extend to hold the sections together and compress the packing 21, thus preventing leakage.

In order to hold the ducts 18 in vertical alignment and, at the same time to permit them to expand vertically parallel to the plane of the walls, I provide, in the illustrative form, a plurality of horizontal channel members 28 (Figs. 3, 5, 6 and 8) through which bolts 29 pass and are held by nuts 30. The heads 31 of these bolts 29 engage in slotted recesses 32 in lugs 33 cast integral with the sections 18, there being two of such lugs for each section, in the illustrative form. The bolts 29 may be loosely held in somewhat enlarged holes in the channels 28, so as to make their headed ends 31 free to move horizontally a short distance about the threaded end as a pivot, to take care of the small amount of horizontal expansion that may occur. It is obvious that the vertical slots in the lugs 33 will permit each section 18 to move vertically. This vertical motion may sometimes occur, due to variations in the expansion of the metal forming the ducts, particularly in relation to the furnace wall itself.

The upper portions of the ducts 15 are made up of sections 40 (Fig. 3) extending outwardly through the exterior of the walls and, in the preferred form, the horizontal air duct 17 is connected to each of the sections 40 by connecting ducts 41. The wall 42 above the vertical ducts is spaced from the upper part of the sections 40, so as to permit their upward motion as the metal of the ducts 15 expands in the heating of the furnace. The wall 42 is supported upon castings 43 that are suspended by straps 44 from cross beams 45 that are, in turn, supported upon I-beams 46. Slip joints 47 (Fig. 3) surrounded by split rings 48 of flexible material to prevent leakage are provided between ducts 17 and 41, and slip joints 49 are provided between the ducts 41 and the wall. In front of the ducts and arranged to form a continuous refractory inner face to the wall is a series of vertical rows of tile and brick. In the form illustrated, the tile are of two shapes arranged alternately in horizontal planes, and there are courses of brick between the tile in vertical planes. Tile 51 in Figs. 5 and 6 of one shape, which I have designated holding tile, are arranged in front of and opposite the spaces between pairs of ducts 15, and alternate tile 52 of a different shape, which I have designated as filling tile, are interposed between the tile 51, the tile 51 and 52 forming horizontal courses. The spaces between horizontal courses of tile are filled with courses of ordinary brick 50 and fire brick 50'. The tile and brick 50' are interlocked as by the tongue and groove arrangement 53. The tile 51 are provided with extensions 51" projecting between ducts 15 and having vertical grooves 54 along the sides thereof, in which projections in the form of pipes 54' secured to the ducts are placed. The brick 50 lie in the spaces between the ducts 15 above and below the projections 51". The bent ends 55 of the holding members or rods 56 fit loosely in the pipes 54', the ends of each pair of rods 56 extending in opposite directions. These members 56 pass through holes in the transverse bars 57 that bridge the spaces between the ducts. The bars 57 are retained against the ducts 15 by means of nuts 58 on the holding members 56, and may be held loosely enough thereagainst to permit the bars to slide up and down along the sections 18. There may be as many of the tile 51 and 52 and the holding members or rods 56 as desired in each vertical row, and the uppermost rods 56 may be anchored in lugs 60 on the duct 41.

As shown in Fig. 5, the side faces of the tile 51 are shaped not only so as to fit the angular corners of the ducts 15, but also have a stepped portion to provide projections 61 at the inner face of each of these tile which will overlap corresponding projections 62 on the filling tile 52, so that as the tile 51 are held in position by the rods 56, the tile 52 will be held in position against the front face of the ducts 15.

Preferably the wall is laid up without luting material, and it will be noted from the above description and the drawings that the several parts of the wall in my preferred form are free to move relatively to each other while, at the same time, tight joints are preserved and the metallic ducts 15 are protected from the direct heat of the furnace. The air flowing through the ducts 15 carry away heat received by the tile 51 and 52, so that a relatively thin wall may be maintained cool enough to prevent its destruction.

The filling tile 52 are independent of the tile 51 and the ducts 15, so that they may expand upwardly either with the tile 51, or independently thereof, and they may expand laterally by an amount equal to the space between the tile 51 and 52.

With the arrangement which I have just described, air may be supplied to the upper ends of the several vertical ducts by a fan 65 through the horizontal duct 17, having short connections 41, each leading to the upper part of one of the vertical ducts 15 in the walls. The air from this fan 65 passes through the horizontal ducts 17, and from thence into the upper part of the vertical ducts 15, from which it flows into the air space 14 beneath the floor of the furnace. From thence it flows to the ducts 66, receiving heat from the side walls and rear wall and from the bottom of the furnace in its progress, and this heated air is supplied to the fuel at the burners 13. In order to insure the flow of the air from the vertical ducts 15 across the furnace bottom, I preferably divide the air space 14 with one or more partitions, one of which is shown at 67 in Fig. 2.

While I have shown my arrangement as one in which the air is forced through the ducts 15, it will be understood that this is not essential and that, in fact, certain portions of my invention may be used quite independently of other portions.

Vertical I-beam supports 70 are provided along the outside of the walls back of the ducts, and the horizontal channel members 28 are connected between them at intervals, and the rectangular spaces thereby formed are closed by flanged metal plates 71, so as to make a continuous metal wall on the other side of the ducts 15 from the tile 51 and 52. The sides of the plates 71 toward the ducts 15 may have insulating material 72 applied thereto, and horizontal channel bars 73 may be located in the air space between the I-beams 70 and the lugs 33 on the ducts 15 on both sides of the rows of bolts 29.

I claim:

1. In a furnace, a wall having a plurality of vertically disposed air ducts therein, each duct comprising a plurality of sections set end to end with the top thereof free to move upwards relatively to the wall, the top section having an opening and the lower section having an opening leading to the combustion space of the furnace, and means forming an air-tight joint between each two sections.

2. In a furnace, a wall having a plurality of vertically disposed air ducts therein, each duct comprising a plurality of sections set end to end with the top thereof free to move upward relatively to the wall, the top section having an opening and the lower section having an opening leading to the combustion space of the furnace, means forming an air-tight joint between each two sections, a manifold connected to the upper part of each of said vertical ducts, and means to force air through said air duct and into and through said vertical ducts.

3. In a furnace wall, a row of vertically disposed ducts, a plurality of horizontal fixed members outside the wall at one side of said row and parallel thereto, connections between said fixed members and said ducts, tile in front of said ducts on the side opposite said fixed members, and connections between said tile and said ducts to maintain the tile in horizontal relation to said ducts.

4. In a furnace wall, a row of vertically disposed ducts, a plurality of horizontal fixed members at one side of said row, connections between said fixed members and said ducts, tile in front of said ducts on the side opposite said fixed members, and connections between said tile and said ducts to maintain the tile in horizontal relation to said ducts, said connections being arranged to permit said ducts to move vertically and horizontally relatively to said fixed members.

5. In a furnace wall, a row of vertically disposed ducts, a plurality of horizontal fixed members at one side of said row, connections between said fixed members and said ducts, tile in front of said ducts on the side opposite said fixed members, and connections between said tile and said ducts to maintain the tile in horizontal relation to said ducts, said connections being arranged to permit said ducts to move vertically and horizontally relatively to said fixed members and to permit said tile to move a limited distance in any direction relatively to said ducts.

6. In a furnace wall, a row of vertically disposed ducts spaced apart, means to maintain said ducts in vertical position, tile at one side of said row, some of said tile having recesses therein, members spanning the space between a pair of said ducts, and connecting members, each engaging a recess in said tile and one of said spanning members.

7. In a furnace wall, a row of vertically disposed ducts spaced apart, means to maintain said ducts in vertical position, tile at one side of said row, some of said tile having recesses therein, members spanning the space between a pair of said ducts, and connecting members, each engaging a recess in said tile and one of said spanning members, each of said connecting members being arranged to permit the tile to move in any direction in a vertical plane.

8. In a furnace wall, a row of vertically disposed ducts spaced apart, means to maintain said ducts in vertical position, tile at one side of said row, each of some of the tile opposite each of the spaces between said ducts having a recess therein, and connecting members extending through the spaces between the ducts and engaging said recesses.

9. In a furnace wall, a row of vertically disposed ducts spaced apart, means to maintain said ducts in vertical position, tile at one side of said row, each of some of the tile opposite each of the spaces between said ducts having a recess therein, connecting members extending through the spaces between the ducts and engaging said recesses, said connecting members being arranged to permit the tile to move in any direction in a vertical plane.

10. In a furnace wall, a row of vertically disposed ducts spaced apart, means to maintain said ducts in vertical position, a vertical row of interlocked tile opposite the space between each pair of vertical ducts and in front thereof, connections between some of the tile of each of said vertical rows and said ducts to hold the tile in vertical position, and filling tile between each of said vertical rows of interlocked tile and having their sides engaging the tile of said interlocked tile to hold said vertical tile in vertical position.

11. A furnace wall having alternate vertical rows of holding tile and filling tile, a row of spaced vertically disposed ducts behind said tile, means to hold said ducts in vertical position and arranged to permit said ducts to move vertically and laterally in the plane of the wall, connections between each row of holding tile and said ducts arranged to permit said tile to move vertically and horizontally in the plane of the wall, said filling tile and said holding tile having their adjacent sides interlocked to hold said filling tile in vertical position.

12. A furnace wall having alternate vertical rows of holding tile and filling tile, a row of spaced vertically disposed ducts behind said tile, means to hold said ducts in vertical position and arranged to permit said ducts to move vertically and laterally in the plane of the wall, each row of holding tile being positioned in front of the space between a pair of said ducts, tile-holding means on the side of said ducts opposite said tile and each extending across the space between a pair of said ducts and bearing against said ducts, and connections between said holding means and some of said holding tile, the adjacent edges of said holding tile and said filling tile being interlocked to hold said filling tile in vertical position.

13. In a furnace wall, a plurality of spaced ducts, a tile in front of each duct, other tile overlapping said first-named tile and extending between said ducts, means securing said last-named tile to said ducts, fixed members outside the wall, and means securing said ducts to said members.

14. In a furnace wall, a plurality of vertically disposed ducts, projections on said ducts and extending lengthwise thereof, tile disposed in front of said ducts and having recesses in which said projections are received, and means for introducing air into said ducts.

15. In a furnace wall, a plurality of spaced ducts, tile disposed in front of said ducts and extending therebetween, projections on said ducts disposed in recesses in said tile, other tile disposed in front of said ducts and between said first-named tile, said first-named tile overlapping said second-named tile to hold them in position, and means for introducing air into said ducts.

16. In a furnace, a wall having a plurality of internally cooled metallic ducts therein arranged in spaced relation, said ducts comprising sections having interfitting terminals with the top and bottom sections having openings for the admission and exit of a cooling medium, and a refractory facing including blocks along that face of the ducts exposed to the fire, other blocks in the spaces between the ducts and engaging the first named blocks to retain the same in position, and means holding the last named blocks in position whereby the components of the assembled structure have free relative movement while maintained in position.

FREDERICK P. FAIRCHILD.